United States Patent
Ricketts (10) Patent No.: US 8,974,163 B2
(45) Date of Patent: Mar. 10, 2015

(54) WEDGE-TYPE DROP-IN ANCHOR ASSEMBLY

(75) Inventor: Michael J. Ricketts, Tulsa, OK (US)

(73) Assignee: Mechanical Plastics Corp., Norwalk, CT (US)

( * ) Notice: Subject to any disclaimer, the term of this patent is extended or adjusted under 35 U.S.C. 154(b) by 536 days.

(21) Appl. No.: 12/584,518

(22) Filed: Sep. 8, 2009

(65) Prior Publication Data

US 2010/0003101 A1   Jan. 7, 2010

Related U.S. Application Data

(60) Provisional application No. 61/191,477, filed on Sep. 9, 2008.

(51) Int. Cl.
*F16B 13/06* (2006.01)

(52) U.S. Cl.
CPC .................................... *F16B 13/063* (2013.01)
USPC ............................... 411/57.1; 411/45; 411/74

(58) Field of Classification Search
USPC ........... 411/45, 46, 47, 48, 57.1, 60.1, 63, 71, 411/74
See application file for complete search history.

(56) References Cited

U.S. PATENT DOCUMENTS

| | | | |
|---|---|---|---|
| 1,000,715 A | | 8/1911 | Caywood |
| 1,115,205 A | * | 10/1914 | Johnson ........................ 411/60.1 |
| 2,120,577 A | * | 6/1938 | Schulte ............................ 411/71 |
| 2,626,023 A | * | 1/1953 | Lear ............................. 411/60.1 |
| 3,726,181 A | * | 4/1973 | Dickow et al. .................. 411/50 |
| 4,537,541 A | * | 8/1985 | Giannuzzi ........................ 411/55 |
| 4,653,132 A | * | 3/1987 | Yamada ........................... 470/14 |
| 4,720,224 A | | 1/1988 | Peterken |
| 4,770,580 A | * | 9/1988 | Fishcher ......................... 411/45 |
| 4,898,505 A | | 2/1990 | Froelich |
| 4,904,135 A | | 2/1990 | Barthomeuf et al. |
| 4,917,552 A | * | 4/1990 | Crawford ........................ 411/32 |
| 4,929,134 A | | 5/1990 | Bergner |
| 4,996,860 A | | 3/1991 | Shinjo |
| 5,116,176 A | * | 5/1992 | Yousuke ......................... 411/65 |
| 5,244,314 A | * | 9/1993 | Calandra et al. ........... 405/259.4 |
| 5,393,179 A | * | 2/1995 | Bane ............................. 411/80.1 |
| 5,569,091 A | * | 10/1996 | Haage et al. .................... 470/12 |
| 5,593,261 A | | 1/1997 | Giannuzzi |
| 5,685,678 A | | 11/1997 | Giannuzzi |
| 5,688,066 A | * | 11/1997 | Loose ........................... 403/297 |
| 5,746,557 A | * | 5/1998 | Kaibach ....................... 411/54.1 |
| 5,911,550 A | | 6/1999 | Popp et al. |
| 6,309,155 B1 | | 10/2001 | Huang |

(Continued)

*Primary Examiner* — Flemming Saether
(74) *Attorney, Agent, or Firm* — Israel Nissenbaum; Yitzy Nissenbaum (57) ABSTRACT

A hybrid drop-in anchor with an expansion sleeve, a split base region of an anchor body and a setting plug. The sleeve surrounds an annular body recess of the body, with a clip portion extending around an annular recess. Clip segments extend from the arcuate portion, each having a proximal portion with an original thickness and a distal portion having at least one projection, extending therefrom. The projection extends from the outer surface without corresponding cavity on an inner surface, with a projection of total thickness greater than the original thickness. After the setting plug is driven, and the threaded male member is inserted and tightened, pulling movement of the anchor moves the expansion sleeve baseward, such that each segment rides outwardly on the tapered portion, providing radial expansion of the anchor and locking, wedging engagement of each segment projection with wall surfaces with enhanced pull-out resistance.

20 Claims, 8 Drawing Sheets

(56) References Cited

U.S. PATENT DOCUMENTS

| | | | |
|---|---|---|---|
| 6,524,046 B2 * | 2/2003 | Hsu | 411/55 |
| 6,666,636 B2 | 12/2003 | Warmolts et al. | |
| 6,829,871 B1 | 12/2004 | McSherry et al. | |
| 6,835,036 B2 | 12/2004 | Paul | |
| 8,192,122 B2 * | 6/2012 | Gaudron et al. | 411/60.1 |
| 2002/0054805 A1 * | 5/2002 | Kaibach et al. | 411/60.1 |
| 2004/0096288 A1 * | 5/2004 | Haug et al. | 411/57.1 |
| 2005/0238457 A1 | 10/2005 | McSherry et al. | |
| 2007/0011357 A1 | 12/2007 | Kobetsky et al. | |
| 2007/0277976 A1 | 12/2007 | Kobetsky et al. | |
| 2008/0152456 A1 | 6/2008 | Kobetsky et al. | |

\* cited by examiner

WEDGE-TYPE DROP-IN ANCHOR ASSEMBLY

BACKGROUND

1. Field of the Invention

The presently described invention generally relates to anchors and more particularly to so-called drop-in anchors having expandable wedge-forming elements for securement of the anchors within holes in work surfaces of concrete, masonry, brick or comparable materials. The invention specifically relates to anchors that are capable of meeting cracked concrete testing standards.

2. Background

The terms "borehole" or "bore hole" and "hole for the anchor" and "anchor hole" and "drill hole" and/or simply "hole", as used in this description, are simply convenient terms, as a hole for such an anchor may be formed in ways other than drilling, boring or punching.

The name "drop-in anchor" is a term of art for a general class of anchors that are especially convenient to use. The term is not intended to limit use of the anchor, which anchor is not necessarily "dropped" or otherwise pressed in place; and such anchors may be used in many applications, including overhead insertion in holes drilled upwardly or other than downwardly, and where in any event the anchors can be conveniently pressed in place in a provided hole and there to be initially set awaiting further use, as typically will involve threading into the anchor a threaded male member such as threaded bolt or rod.

Where ease of installation is important, drop-in anchors conveniently allow quick installation. A drop-in anchor allows preliminary setting, that is, initial anchor embedment. Preliminary setting may be carried out by using a setting tool, driven into a central bore of the anchor, to cause initial spreading apart of base portions of the anchor that will cause these anchor portions to come into initial anchoring frictional engagement with the walls of hole that has received the anchor. In the present description, and for convenience herein only, the base is that portion of the anchor that is first inserted into the hole, and thus that portion that is most deeply located in the hole, even though there may be other terminologies (such as "head") used by some in the art in dealing with corresponding parts of drop-in anchors.

The name "wedge anchors" is a term of art long used to refer to another type of anchor, otherwise known or sometimes known as a sleeve anchor. U.S. Pat. No. 4,720,224 that issued to Peterken on Jan. 19, 1988, is representative of one configuration of a wedge anchor. The assignee of said U.S. Pat. No. 4,720,224 is the same company, operating now under another name, that is the present assignee.

The Peterken U.S. Pat. No. 4,720,224 shows such a sleeve anchor for use in a pre-drilled hole in concrete, masonry and the like. It includes a bolt having a threaded outer end for receiving an internally threaded pressure member. The inner end defines a shank terminating in what is called in the patent a "head" of diameter greater than the shank. The head (which, by analogy, in the present description, and for convenience herein only, can be thought of as that base portion of the sleeve anchor that is most deeply located in the hole), has a tapered wedge-forming shoulder adjoining the shank. A sleeve is disposed concentrically upon the bolt and includes a collar extending along a threaded portion of the bolt at its upper outer end is disposed for receiving longitudinal pressure toward the inner end of the bolt generated by tightening of the nut. An inner portion of the Peterken collar is of petalform configuration, having three petals extending along the shank in closely-spaced side-by-side relationship. The petals are joined at proximal ends to the collar by respective pillars each of narrow arcuate extent, providing windows between the pillars of greater arcuate extent. The pillars have distal ends that contact and ride up the shoulder for radially outward expansion of the sleeve upon tightening of the pressure member. For present purposes, the direction toward the head of Peterken U.S. Pat. No. 4,720,224 could be referred to herein as the baseward direction, as the head portion is inserted into a hole for the anchor, and becomes the base of the anchor.

By comparison a drop-in anchor assembly of a type to which the present invention relates has an internally threaded body, generally of robust wall thickness and an internal bore, part of which is internally threaded. The body may have a radially channeled region. A baseward portion is provided with multiple longitudinal channels extending from a base end forming arcuate sections. The channeled region is annularly recessed for receiving an expansion sleeve. Within the body, inwardly tapered inner walls have diameter reducing toward the base end, that is, that end to be first inserted into a hole of predetermined depth. A setting plug is fitted within the channeled region, and so also is tapered with diameter reducing toward the base. The bore, or through-bore, can receive first an unthreaded setting tool for engaging the plug upper surface for initial setting. The setting plug is initially driven by forcing a setting tool into the bore of the body, so the plug urges portions of the arcuate sections of the radially channeled region axially outwardly for initial setting of the anchor assembly in the borehole. Only then are the internal threads of the bore to receive a threaded male member such as a threaded rod, headless screw, or other screw. The body channeled region can have an annular recess along a portion of the channeled region spaced above the base end with a neck of substantially constant diameter and a tapered portion having tapered outer walls increasing in diameter toward the base end. A clip, or what may be called a sleeve, having petalform distal portions is resiliently fitted on the annular recess in circumferential relation. When a threaded male member is screwed in place and force is placed on the anchor in a direction outwardly of the hole, that is with pull-out force, the distal clip portions ride along the tapered outer walls toward the base end for wedging against the hole wall for final setting of the anchor.

Drop-in anchors and wedge anchors have both been long available. Among the design goals for drop-in anchors are to achieve not only fast and easy installation but, most importantly, to be sure of setting the anchor assembly in the borehole with increased tightness providing enhanced pull-out resistance so as to provide stability and reliability under various conditions.

Among various conditions that may be present are irregularities or surface variations in a hole in which the anchor is to be set. Irregularities may result from dimensional variations or they may vary as a result of the degree to which a hole is cleaned (such as by compressed air or by brushing) after hole drilling.

Problems to be Solved

An extraordinary and most extreme condition is cracking in concrete (or other material) in which the anchor is received. This condition is referred to as cracked concrete. Cracks in concrete, occurring for whatever reasons after an anchor is already in place, and that occur because of tensile stress, resulting strain and yielding, or other factors in the material (such as temperature or chemistry or curing changes), may extend near to or even to the hole in which an anchor is or would be received. The present disclosure is not concerned with the several possible causes for concrete cracking. Regardless of how concrete becomes cracked, it is desired that an anchor of the present type continue to be reliably retained, and that it continue to provide enhanced pull-out resistance, even in cracked concrete conditions.

Tightening of a drop-in anchor to cause it to become finally set can occur in different ways. A structure to be secured may have cap screws that when tightened pull outwardly on the anchor. Or a threaded rod may have a nut tightened against the anchor. Various forms of the threaded male member that engages the anchor are not part of this disclosure.

Wedge anchors, distinguished from drop-in anchors, when correctly installed provide high pull-out resistance and reliability under ultimate loading conditions. By comparison, drop-in anchors provide convenience and ease of use with relatively high pull-out resistance.

Drop-in anchors with a clip capable of riding upon a tapered portion of the anchor body near its base have been used, and with clip having plural baseward sections that project toward the base. These sections are integrally formed as part of the clip, and have proximal ends that merge into the clip body, which body has a generally C-shaped configuration so that it conforms resiliently to an annular straight-walled portion of the anchor body. The sections have free proximal ends that extend toward, or may partly extend over a portion, of a tapered base portion of the anchor body. When the anchor is being set, there is relative movement between the clip and the anchor body, causing the distal portions of the baseward clip sections to ride along the tapered base portion. This causes the distal portions to extend into ever tighter engagement with portions of the walls of the hole for the anchor.

If there were dimpling of the distal portions of the baseward clip sections during stamping, each dimpling of a distal portion would cause a corresponding outward protrusion, i.e., so that there is a corresponding cavity on an inner surface of a clip section for every outward protrusion on an outer surface of a clip section, with the intent that as the distal portions extend into ever tighter engagement with corresponding portions of the hole walls during setting, the outward protrusions engage hole wall surfaces for enhanced gripping.

A limitation of using protrusions resulting from dimpling is that under sufficient radially compressive forces resulting from extreme pull-out forces following setting, the resultant squeezing of distal portions of the clip could result in a collapsing of the dimpling or protrusions, causing in other words flattening, with resultant tendency to reduce the wedged impingement of the distal ends against the hole walls.

Kobetsky et al. U.S. Patent Application 2007/0277976 published Dec. 6, 2007, has suggested a wedge-type anchor assembly, said to be capable of meeting cracked concrete testing standards, employing a substantially C-shaped expansion sleeve component annularly disposed about the anchor bolt component. A plurality of annular grooves, threads, or teeth are disposed only about the forward end portion of the expansion sleeve component, as opposed to throughout the entire axial length thereof, so that when the anchor bolt component is moved axially through the expansion sleeve component, a maximum interference area (M.I.A.) and maximum interference volume (M.I.V.) can be generated between the anchor bolt component and the expansion sleeve component in a controlled and predictable manner, as well as between the expansion sleeve component and the internal peripheral side wall portions of a concrete substrate or substructure can be generated so as to enhance pull-out resistance and reliability of the anchor assembly within the concrete substructure or substrate.

The "forward end portion" of the expansion sleeve component is believed to be similar in function to distal portions of the baseward clip sections of the present disclosure. The arrangement proposed by Patent Publication 2007/0277976 is challenged by the same possible resultant squeezing of the disclosed annular grooves, threads, or teeth disposed only about the forward end portion of the expansion sleeve component of that patent publication. That is, the grooves, threads, or teeth portions of the clip could result in a collapsing or bending over, with resultant tendency to reduce the wedging of the distal ends against the hole walls.

Therefore, the challenge in the art remains to provide an anchor with a clip having portions that are wedged into a locking arrangement within the anchor hole without inherent tendency to reduce the wedged impingement of the distal ends against the hole walls in the event of extreme pullout forces, and are capable of maintaining reliable securement even in the event that the anchor is located in a hole in cracked concrete or under conditions in which the installation may be under cracked concrete specifications.

The challenge in the art continues to be the provision of an anchor with a clip, where the anchor is capable of meeting cracked concrete testing specifications.

BRIEF SUMMARY OF THE INVENTION

Among the objects, features, advantages and benefits of the present invention are the provision of:
 a drop-in anchor on which there is provided a clip operating comparably to a clip-type anchor;
 a wedge-type anchor capable of meeting cracked concrete testing specifications;
 a drop-in anchor capable of meeting cracked concrete testing specifications;
 a drop-in anchor achieving very high pull-out resistance;
 a drop-in anchor that is highly reliable and safe in use;
 a drop-in anchor that is not only convenient and easy to use but also is economical and relatively easy to fabricate;
 a drop-in anchor that has pull-out resistance characteristics that are maintained for a long period of time for long service over years, and which are stable within the concrete substrates or substructures even though there are changes in the condition of the concrete external environmental conditions;
Among the objects, features, advantages and benefits of the present invention are the provision of:
 Briefly, a hybrid drop-in anchor is provided with an anchoring sleeve. The anchor has internal threading and a split base region into which a setting plug can be driven baseward by a setting tool for preliminary setting when the anchor is inserted, base end first, into a borehole. A threaded male member can be threaded into the anchor for final setting. An expansion sleeve of the invention is annularly disposed about an external annular recess of the body, above a tapered portion of the base region that tapers in the baseward direction. The sleeve is formed by stamping of a blank of metal to have a clip arcuate portion of the sleeve extending at least most of the periphery around the external annular recess of the anchor body. The expansion sleeve has at least one or preferably more clip segments extending baseward from the clip arcuate portion for anchor engagement of surfaces of the borehole. The anchor body and expansion sleeve are diametrically dimensioned for fitting into the borehole when inserted. Further, each clip segment has a proximal portion and a distal portion, each segment proximal portion having a segment intrinsic radial thickness as measured from an outer surface to an inner surface at a proximal portion of the segment. The segment outer surface extends from the proximal portion to the distal portion. Each segment includes at least one intrinsic projection standing radially outwardly from the outer surface of the distal portion and which projection raised from the outer surface of the distal portion without dimpling, i.e., corresponding cavity, on an inner surface, such that the segment has a projection of thickened total depth greater than the segment intrinsic radial thickness. After the setting plug is driven baseward, the threaded male member is inserted and tightened. This causes pulling movement of the anchor but contact of the segments with the borehole walls moves the expansion sleeve baseward. This causes each segment to ride radially outwardly resiliently on the tapered portion for baseward radial expansion of the anchor to cause corresponding locking, wedging engagement of each segment projection with wall surfaces of the borehole. This causes permanent setting of the anchor in the borehole with increased tightness providing enhanced pull-out resistance such that the anchor meets specifications for load and resistance against pull-out. These specifications can be cracked concrete specifications.

Other features will be in part apparent and in part pointed out below.

BRIEF DESCRIPTION OF THE DRAWINGS

FIG. 9b is a three-dimensional view of a partially-formed expansion sleeve, still in flat orientation before final forming, after stamping of the blank, as viewed from an outer face, showing four sections, each having on a distal portion a projection which has been created by the process of stamping of the blank of FIG. 9a.

FIG. 9b2 is a three-dimensional view of a second embodiment of a partially-formed expansion sleeve, otherwise similar to FIG. 9b and similarly viewed from an outer face, but where each section distal portion carries two projections created by stamping of the blank of FIG. 9a.

FIG. 9c2 is a three-dimensional view of the second embodiment of the partially-formed expansion sleeve, as viewed from an inner face, where cavities from stamping appear in positions corresponding to a first set of projections, but no corresponding cavities from stamping appear in positions corresponding to a second, more distal, set of projections.

Corresponding reference characters indicate corresponding parts in multiple figures of the drawings.

DETAILED DESCRIPTION OF THE INVENTION

Referring to the drawings, an embodiment of anchor assembly of the invention is generally designated A. For convenience, the anchor assembly may be referred to, throughout this document, as an anchor. It is a hybrid, in the sense that it is a hybrid drop-in anchor provided with an anchoring sleeve.

With reference initially to FIGS. 1-4, the general anchor features are first considered. The anchor has a body 100 that has a through bore 102 having internal threading 104. A split base region 106 has inserted into its central bore a tapered approximately bullet- or conical-shaped setting plug 108, held in place during shipment and storage by a thin wafer 109, as of resilient synthetic material. The plug is capable of being driven baseward by setting tool 110 (FIG. 5) as by a hammer 112 for preliminary setting when the anchor is inserted, base end first, into a borehole. Such a hole is shown at 114 in FIG. 5 and in other figures. A threaded male member such as a bolt 116, or a threaded rod, or other threaded member that is to become anchored by means of anchor A can be threaded into the anchor for final setting.

Figure 3:
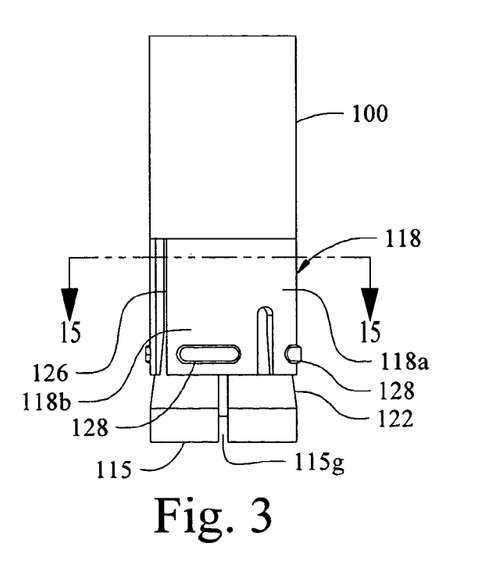
FIG. 3 is another side elevation of the new anchor as taken from another side of the anchor.
Figure 4:
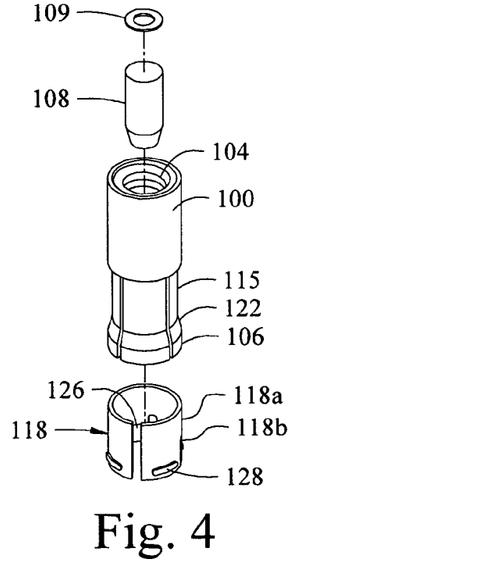
FIG. 4 is an exploded perspective of the new anchor assembly to show its internal and external components.

FIGS. 3 and 4 show that the body base 106 is divided into four arcuate equilateral sectors 115, defined by linear gaps 115g, so that forcing of plug 108 baseward as by use of setting tool 110 will cause spreading radially within a hole 114.

Other principal features are to be considered. The anchor is provided with an expansion sleeve, generally designated 118, that is annularly disposed about an external annular recess 120 of the anchor body, and the recess and sleeve are positioned above, but in contact with, a tapered portion 122 of the base 106. Portion 122 tapers uniformly, that is, linearly, outwardly in the baseward direction, that is, toward a lower end or base as depicted. The base may be referred as the "head" by some anchor users. A preferred angle α formed by the surface of portion 122 relative to the longitudinal central axis is in the generally preferred range from about 11 degrees 30 minutes to about 13 degrees 30 minutes, and a most preferred angle is 12.7 degrees.

Figure 1:
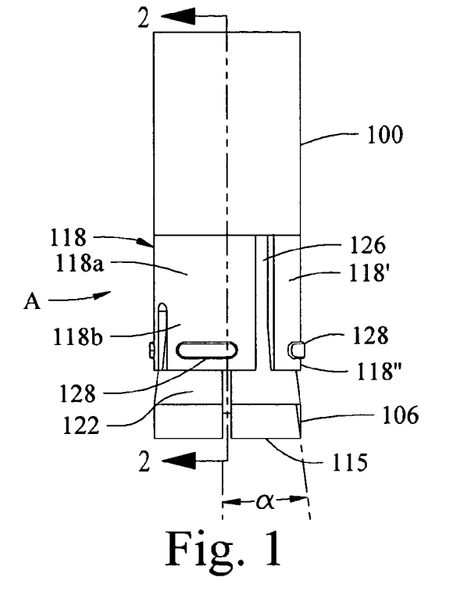
FIG. 1 is side elevation view of a wedge-type drop-in anchor in accordance with the present invention.
Figure 2:
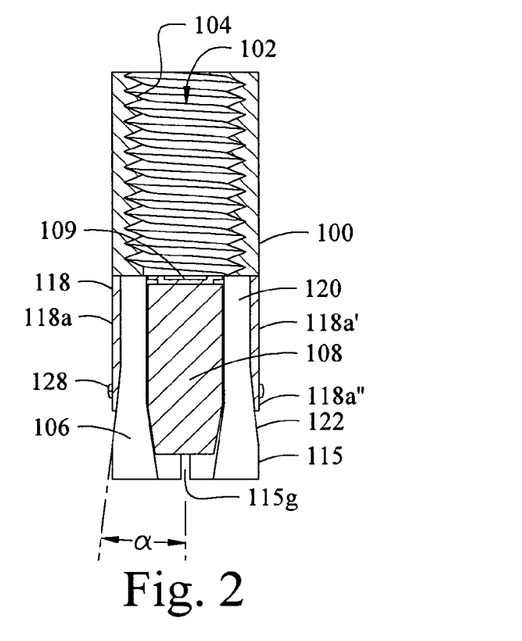
FIG. 2 is a vertical cross-section of the new anchor taken along line 2-2 of FIG. 1.

Sleeve 118 is formed by stamping of a flat blank of metal alloy. A representative such blank is shown at 124 in FIG. 9a where it is shown that the blank has a predetermined blank thickness $T_{blank}$. The metal is preferred to be of a selected alloy having high strength yet capability of being stamped to desired shape and configuration. Examples of useful steels and alloys generally include, but are not limited to, cold-formed mild steel, medium carbon steel, nickel steel and stainless steels. A specifically preferred composition is 316 stainless steel. The sleeve after stamping and rolling provides a C-shaped arcuate clip portion 118a of the sleeve extending at least most of the periphery around the body annular recess 120 of the anchor body, and preferably as illustrated only a slight gap 126 separates the ends of arcuate portion 118a as portion 118a resiliently grips annular recess 120. The expansion sleeve has at least one or preferably more clip segments extending baseward from the clip arcuate portion for anchor engagement of surfaces of the borehole. In the embodiment shown, four clip segments 118b are shown. The anchor body and expansion sleeve are diametrically dimensioned, providing together cylindrical surfaces, for snugly fitting in the borehole when inserted. As is seen in FIGS. 1-3 the outer diameters (O.D.) of the principal portion of body 100 and of sleeve clip portion 118a are very closely identical, being intended to provide a general O.D. of predetermined accuracy for relatively precise and tight fitting into the desired hole, such as that shown 114. Anchor A may be of various predetermined standardized sizes and diameters and so intended for various holes of known size and depth, that are to be drilled or provided according to specification for receiving a specific size of the new anchor providing pull-out resistance necessary for the intended use.

Sleeve 118 extends smoothly and integrally from the generally C-shaped clip portion 118a into the four clip segments 118b, each of which has a proximal portion 118a' and a distal portion 118a" (FIGS. 1 and 2). Provided proximate the baseward end or tip of such distal portion of each segment is a projection ("boss") 128 that is preferably and more conveniently termed simply "boss" and such term in used herein. The configuration of each such boss is described below.

Thus, it is to be appreciated that each segment includes at least one boss 128, that is, an intrinsic, integrally formed, projection 128 standing radially outwardly from the outer surface of the distal portion. Two embodiments for sleeve 118 are shown. A first embodiment is that shown in FIGS. 1-8 and in FIGS. 9b and 9d and so also FIG. 10a in particular. FIGS. 9b2, 9c2 and 10b are specific to the second embodiment. FIGS. 12-17 illustrate operation of an anchor using the first clip embodiment.

Figure 8A:
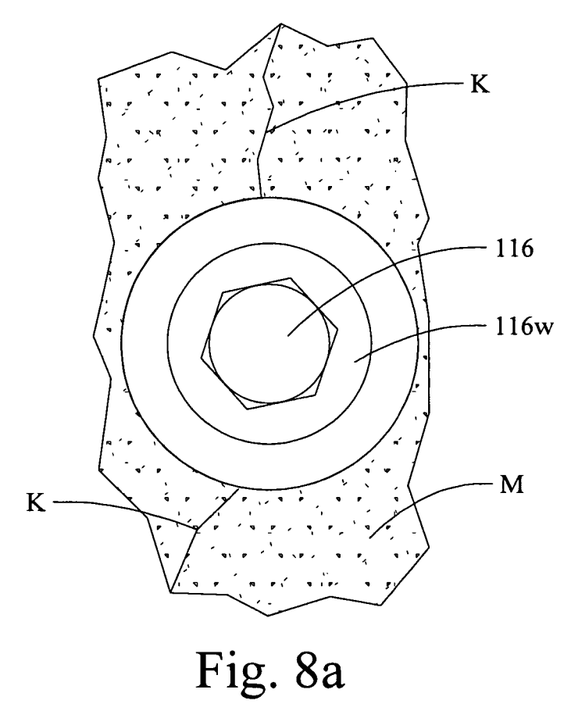
FIG. 8a is a top view of the anchor in concrete or comparable material in which a crack runs to the anchor.
Figure 8B:
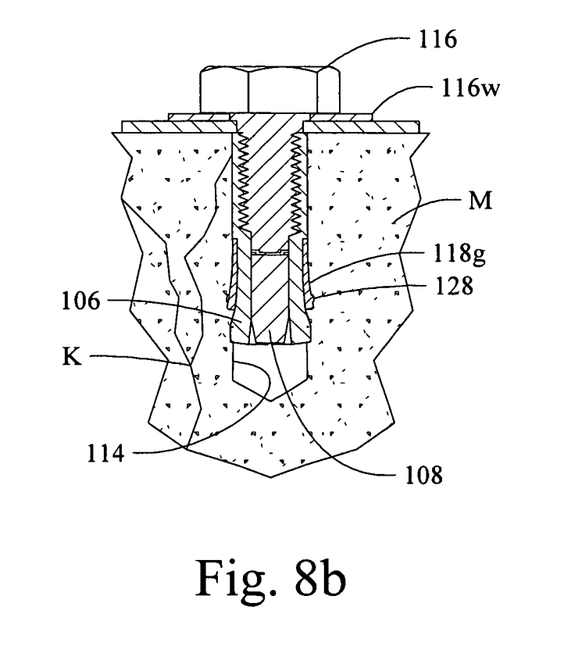
FIG. 8b is a cross section of the anchor in concrete or comparable material after it has been finally set.
Figure 9A:
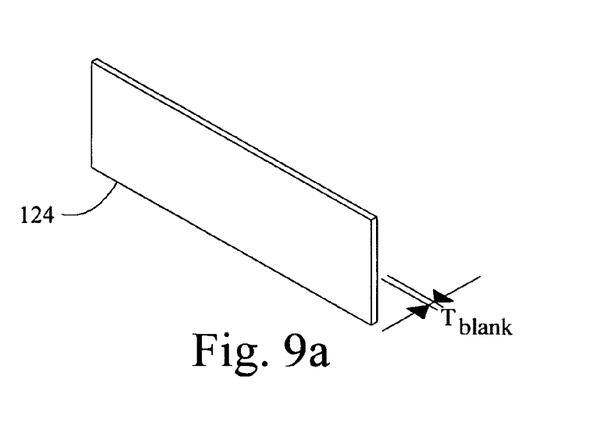
FIG. 9a is a three-dimensional view of a blank of metal from which an expansion sleeve of the invention is to be formed by stamping.
Figure 9B:
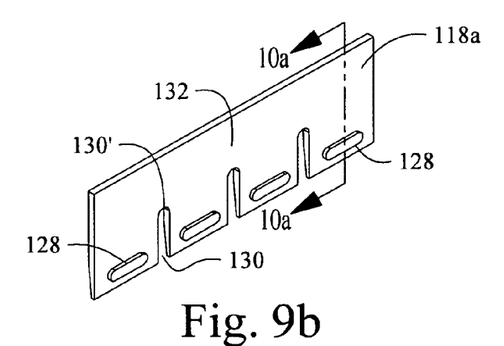
Figure 9B:
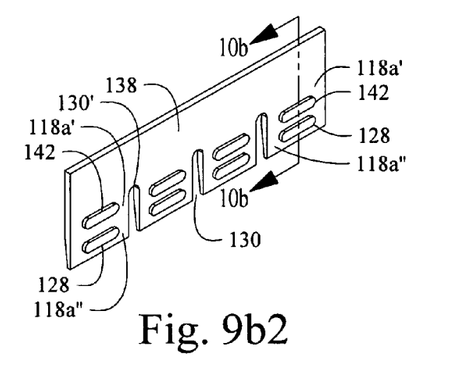
Figure 9C:
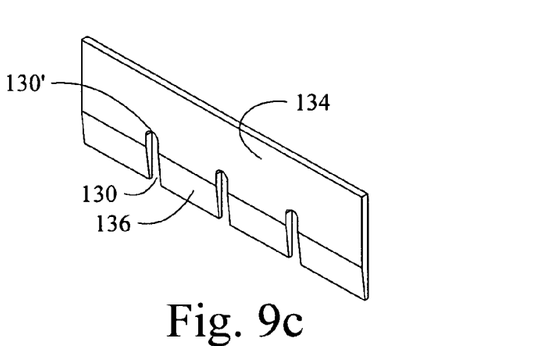
FIG. 9c is a three-dimensional opposite view, that is of an inner face, of a partially-formed expansion sleeve, still in flat orientation before final forming, after stamping of the blank. No dimpling is present on the inner surface of the distal portion of each section, although each section has a projection on the outer surface shown in FIG. 9b.
Figure 9C:
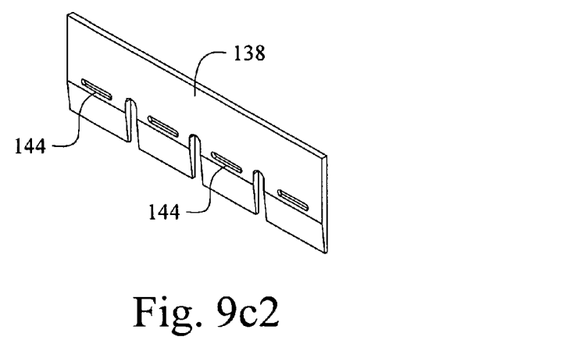
Figure 9D:
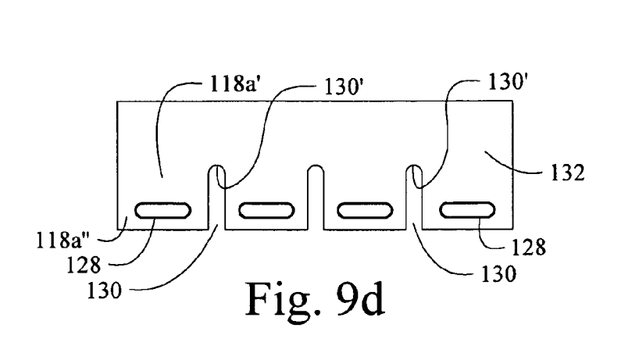
FIG. 9d is a frontal elevation view of the outer face of the partially-formed expansion sleeve, showing the sections and projection of each section.
Figure 10A:
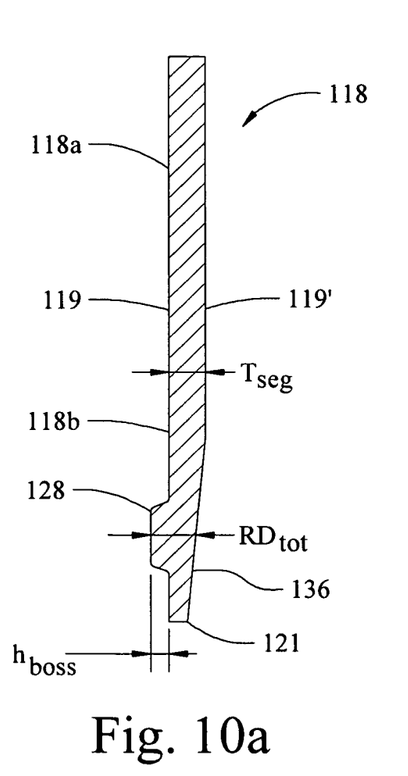
FIG. 10a is an enlarged cross-section of sleeve portions including a sleeve section in which a single projection has been created on an outer surface during stamping, as taken on line 10a-10a of FIG. 9b.

With reference to the first embodiment, and to FIGS. 1-8 and in FIGS. 9b and 9d and FIG. 10a, each such boss is of generally bar shape, extending horizontally, that is, perpendicularly relative to the anchor central axis, and more specifically with arcuate length along almost the entirety of the width of the segment distal portion but terminating just short of the edges of the distal portion. Each boss 128 is of height, that is, dimension measured along the respective segment, in the range of about 10 to 20% of its length (corresponding to aspect ratios ranging from about 10:1 to about 5:1) and has only very slight edge rounding so as to present in horizontal (transverse) profile a truncated semipyramidal aspect. Other possible boss or protrusions, that is, intrinsic projections, from the clip segments, that possibly may be used in place of truncated semipyramidal are stars, rounds, inverted "V" and comparable boss-defining geometries.

See now especially FIG. 10a which is a section taken along line 10a-10a of FIG. 9b, to appreciate that the outer and inner surfaces of each clip segment portion are respectively designated by reference characters 119 and 119'. Each segment proximal portion has a segment intrinsic radial thickness $T_{seg}$ as measured from the segment outer surface to the segment inner surface 119' at a segment proximal portion 118a. The segment outer surface extends from the proximal portion 118a to the tip 121 of the distal portion 118b. The thickness $T_{seg}$ is no greater than the predetermined blank thickness $T_{blank}$. Each such boss 128 is raised from the outer surface of the distal portion by a height $h_{boss}$ as a deliberate stamping artifact created by metal uprise flow during stamping the blank. That is, stamping is carried out in a manner to cause each boss 128 to rise from the segment outer surface by metal flow yet without corresponding dimpling of said blank, such that the segment has a boss total radial depth $RD_{tot}$, that is a total thickness, measured from an outer surface of the boss 128 to said inner surface 119'. The boss total radial depth $RD_{tot}$ is thus enhanced by stamping, being greater than the segment intrinsic radial thickness $T_{seg}$. So also, the boss total radial depth $RD_{tot}$ is greater than the predetermined blank thickness $T_{blank}$. The intent of such a boss arrangement is to provide extreme crush resistance, and its effect will be more readily apparent from a discussion of the operation of the anchor when it is first preliminarily set and then finally set.

Figure 9E:
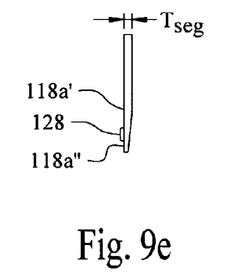
FIG. 9e is a side elevation view of the partially-formed expansion sleeve, showing the section profile and section projection.
Figure 9F:
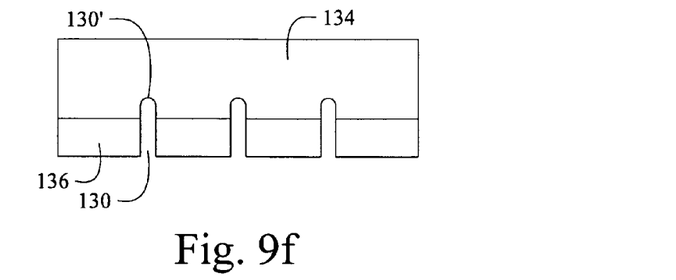
FIG. 9f is an elevation view of the inner face of the partially-formed expansion sleeve.

Formation of sleeve 118 by stamping is understood from consideration of the sheet of drawings beginning with FIG. 9a that shows that blank 124 begins as an elongated rectangular strip of the above-mentioned preferred steel or steel alloy of thickness $T_{blank}$, as may be cut from length of the preferred material. In one of a series of appropriate stamping steps the rectangular blank, still planar, as shown in FIG. 9b, is provided with that portion 118a that becomes the upper part of the clip as according to FIGS. 1-4, etc., and the petal-form segments 118b sections, here being most preferably four in number, although that the number of sections could differ according to a preferred ultimate sleeve configuration or use or specialized construction. As particularly FIGS. 9b and 9d and others of the FIG. 9 series show, the segments are separated by gaps 130 that preferably extend across substantially half the width of the strip and terminate with semicircular radius as shown at 130'. A front or outer side 132 of the strip carries the bosses 128, that extend from this planar outer side 132. The rear or inner side 134 (FIG. 9c) of the strip is preferably formed during stamping to create a slight taper or bevel 136 by which the thickness of each section formed between the gaps 130 is reduced toward the distal end 118a" of each section, and cross-section of FIG. 9e so illustrates.

Sleeve 118 is formed by rolling of the stamped strip to conform closely to the body to produce a configuration shown in FIGS. 11a through 11d and so it will be clear that the length of the rolled blank 124 as formed into sleeve 118 will have been selected so that the periphery of the external annular recess 120 (FIG. 2) will be very closely matched and that gap 126 (FIGS. 1, 3 and 4) is extremely limited, but with the sleeve being resiliently captive upon external annular recess 120.

Figures 5, 6, 7:
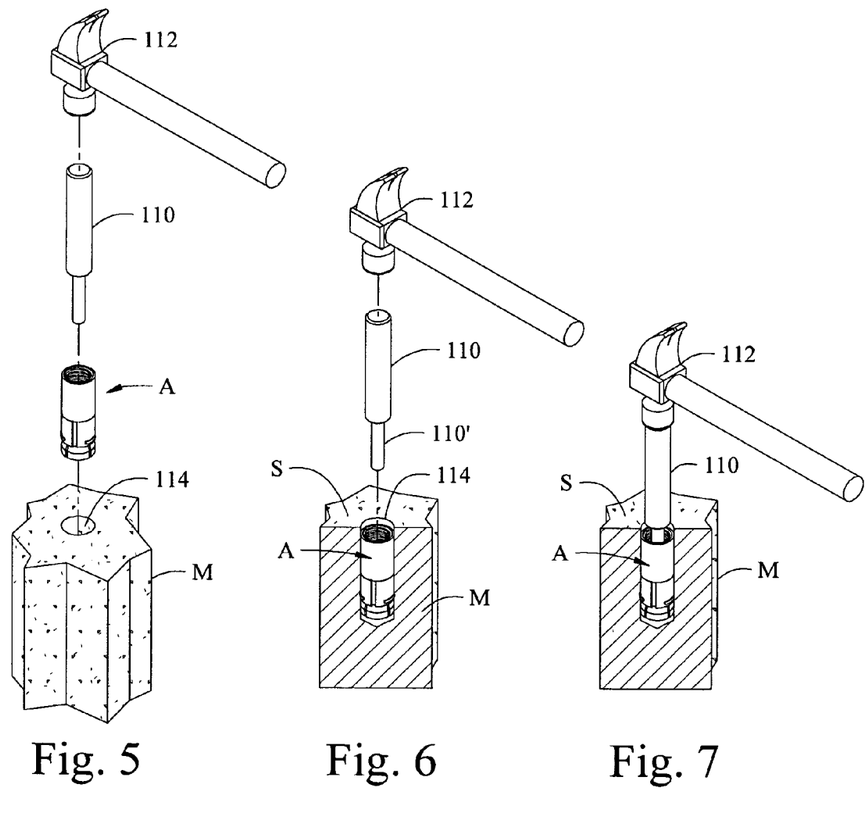
FIG. 5 is a perspective illustration of the anchor, a setting tool and drive hammer for preliminary setting, after insertion into a hole in concrete or comparable material.
FIG. 6 is a cross-section of a portion of such concrete or comparable material, with the new anchor having been pressed into place.
FIG. 7 shows the act of preliminary setting of the anchor.

Operation of the new anchor having the construction described above is shown generally in FIGS. 5, 6 and 7. When anchor A is inserted into a hole 114, the hole will have been drilled or otherwise formed to have a depth and bore diameter specific to a chosen anchor, which will in turn be selected according to a desired size, use and pullout resistance specification. In FIG. 6, anchor A is shown inserted. The base end 106 (see FIGS. 1 and 2) might or might not contact the bottom of the hole, as the anchor in the course when rapidly inserted might simply be pushed flush with the surface S of a construction material M that could be cured concrete or a comparable dense and relatively unyielding building or construction material. A conventional setting tool 110 having a shank 110' is inserted into the bore of the anchor and driven downward by a customary setting tool such as a hammer 112. Setting plug 108 (FIGS. 2 and 4) is driven baseward, as shown in FIG. 8b, causing the four arcuate equilateral base sectors 115 to be driven into relatively tight initial setting engagement with interior walls of hole 114, so that the anchor is then reliably initially set and awaits further use and final setting. Thus the function of setting plug is in the first instance to bring about initial setting of the anchor. The anchor is not finally set until a threaded male member such as bolt 116, or a threaded rod, or other threaded tension member is inserted and tightened. A washer 116w may be used under the head of bolt 116.

Figure 12:
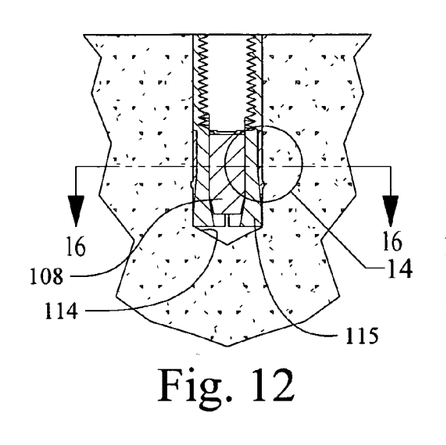
FIG. 12 is a vertical cross-section of the anchor assembly in place in a borehole, with a bolt having been threaded into position after the anchor has been preliminarily set in the hole.
Figure 13:
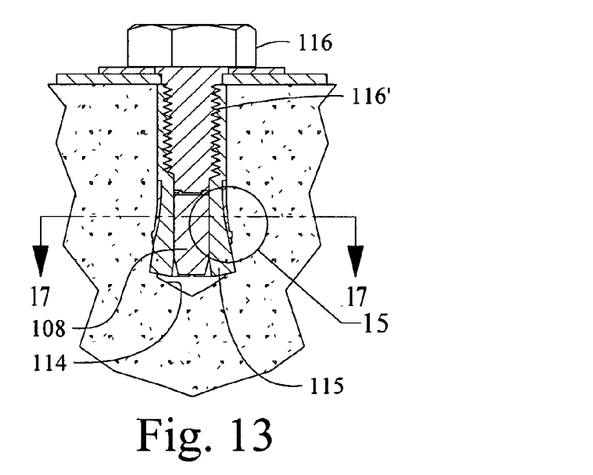
FIG. 13 is a vertical cross-section of the anchor assembly after the bolt has been tightened so as cause the anchor to be finally set.
Figure 14:
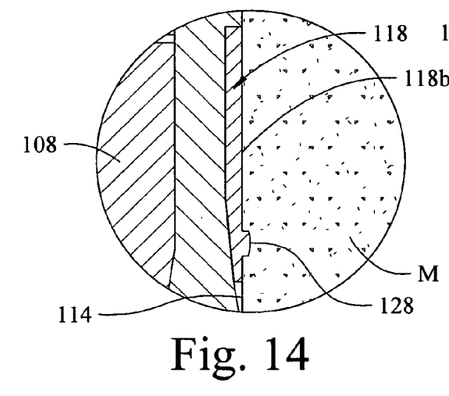
FIG. 14 is an enlarged fragmentary cross-section of the anchor assembly as taken in the region marked 14 in FIG. 12.
Figure 15:
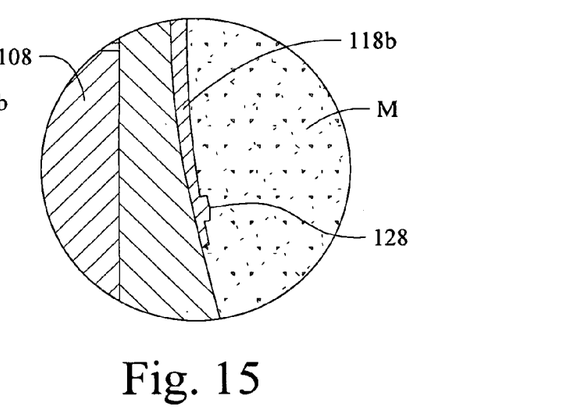
FIG. 15 is an enlarged fragmentary cross-section of the anchor assembly as taken in the region marked 15 in FIG. 13 and as taken along the section marked 15-15 in FIG. 3.
Figure 16:
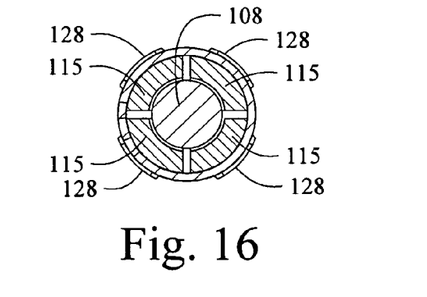
FIG. 16 is a horizontal cross-section of the anchor, with the bolt in place, taken at a level indicated at 16-16 in FIG. 12.
Figure 17:
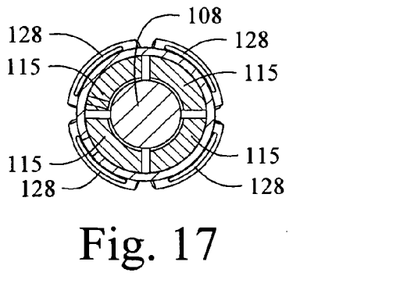
FIG. 17 is a horizontal cross-section of the anchor, with the bolt in place, taken at a level indicated at 17-17 in FIG. 13.

Referring to FIGS. 12 and 13, insertion of a threaded male member such as bolt 116 will cause its threaded shank 116' to engage plug 108 and prevent its upward movement within the anchor body, and so the sections 115 of the anchor base are held in engaging securement within the hole. As the anchor is now tight in the hole, although not finally set in the hole, the bosses 128, as they are unyielding relative to the anchor body, begin to engage wall surfaces of the hole. FIG. 14 shows such initial engagement. Further tightening of the threaded male member such as bolt 116 causes pulling movement of the anchor assembly but contact of the segments with the borehole walls moves sleeve 118 relatively baseward, so that there is relative movement between anchor body 100 and the sleeve. As this takes place, the C-shaped clip portion 118a and the four clip segments 118b extending from the clip portion ride radially outwardly resiliently on the tapered portion 122 of base 106 so as to cause baseward radial expansion of the anchor to cause corresponding locking, wedging engagement of each segment boss 128 with wall surfaces of the borehole. The sleeve distal portions become wedged between base tapered portion 122 and the walls of the hole and the sleeve segments assume an angle closely coincident to the angle of taper $\alpha$ of tapered portion 122. Each segment boss 128 becomes relatively embedded in the grain structure or texture of the material mass M and thus becomes itself anchored within the material mass M. Even further tightening of threaded male member such as bolt 116 causes further tensioning in direction outwardly of the hole with pulling of the anchor assembly with ever increasing jamming of the sleeve distal portions and wedging embedment of segment bosses 128 as shown in FIGS. 13-17 but any relative further movement of sleeve 118 relative to the anchor body causes the segment bosses to even more deeply embed themselves in the material M.

FIG. 13 shows that increasing depth of penetration of the shaft 116' of bolt 116, representing one type of threaded male member, may cause the lower end, or tip, of the shaft 116' to drive plug 108 still further into the base of the anchor body, and so forcing further radially outward the four base portions 116, with corresponding still further jamming of the sleeve 118 against the interior walls of the hole.

Because the boss total radial depth $RD_{tot}$ provides an essentially nearly completely incompressible thickness, any further outward compression resulting from pullout tension on anchor A is transferred by body tapered portion 122 directly into the steel or alloy material of which the sleeve is formed, and with energy focused into the upraised profile of each boss 128, as the force is transmitted through the boss total radial depth $RD_{tot}$ of sleeve material. Because of the width and height of the bosses 128, full compression is achieved without concern or likelihood of any collapse of sleeve material, and without a corresponding stamping cavity (dimple) on the body inner side of each boss 128, there can be no cavity collapses under a boss 128 as here configured.

Because each boss 128 extends outward from sleeve 118 in a direction normal to the surface of the respective sleeve section carrying the boss, movement of the sleeve over the tapered base portion 122, which is at the angle $\alpha$ discussed above, the sleeve distal section 118b will follow such angle, thus causing the boss outward direction to be reoriented upwardly from horizontal, forming an angle of upward thrust of $\alpha+90$ degrees relative to the longitudinal central axis of the anchor, that is in a direction resisting removing of the anchor, and so enhancing its interlocking engagement with surfaces of the borehole in that the outward orientation of the boss, i.e., the normal to its outer surface is approximately or substantially at an angle $\alpha$ to horizontal, that is, where "horizontal" simply for convenience is meant relative to the present drawings and connotes the angular orientation of the surface in which the borehole is provided, being in any event determined by the location of the borehole that may be provided anywhere, including overhead or on a wall or other non-horizontal wall.

The ultimate wedging action of sleeve 118 and collapse-free prominence and integrity of each boss 128 causes permanent or what can be termed "final setting" of the anchor assembly in the borehole with increased tightness providing enhanced pull-out resistance such that the anchor meets specifications for load and resistance against pull-out. These specifications can be cracked concrete specifications that are in general conditions in which not only there could be any instance in which cracking of concrete in which one or more cracks could affect continuity or homogeneity of the material M but where a crack would be assumed to communicate with a borehole in the material in which one or more anchors of the present general type of expansion anchors are to be installed. In the case of cracked concrete conditions, such as symbolized by cracks designated K in FIG. 8a, but not necessarily shown in any true detail in that figure, cracking K as shown in this top view of FIG. 8b may have the effect of regionalized or local displacement of material M so as conceivably to bring about a distortion of hole 114 and its inner walls, and yet under these conditions, resulting in any further baseward movement of the sleeve, the pullout tension on anchor A continues to be transferred by body tapered portion 122 directly into sleeve 118 and thus into the steel or alloy material of which the sleeve is formed, and so is transmitted through the boss total radial depth $RD_{tot}$ of sleeve material.

Figure 10B:
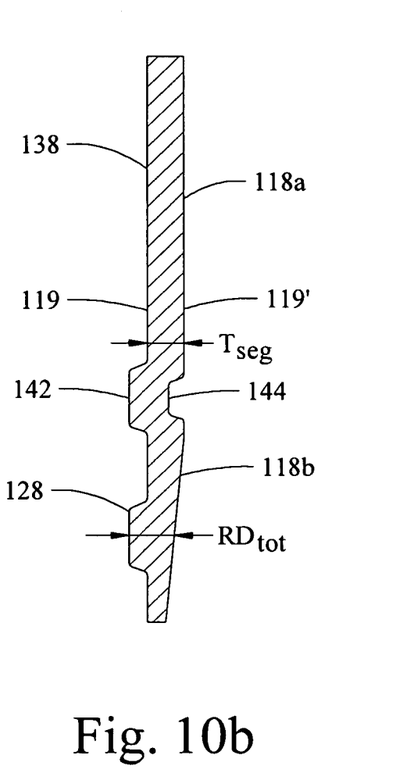
FIG. 10b is an enlarged cross-section of sleeve portions including a sleeve section in which upper and lower projections have been created on an outer surface during stamping, as taken on line 10b-10b of FIG. 9b2, and with a corresponding cavity from stamping being present on an inner surface in a position opposite to the upper projection.
Figure 11A:
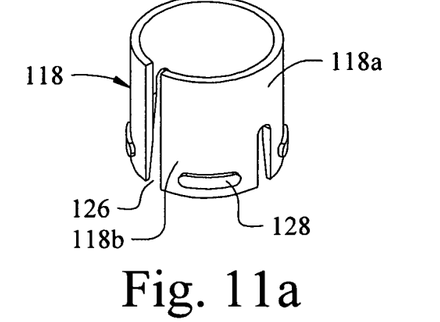
FIG. 11a is a three-dimensional view of only the sleeve of the new anchor.
Figure 11B:
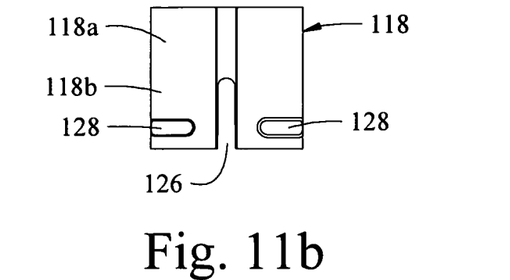
FIG. 11b is a side elevation view of the sleeve.
Figure 11C:
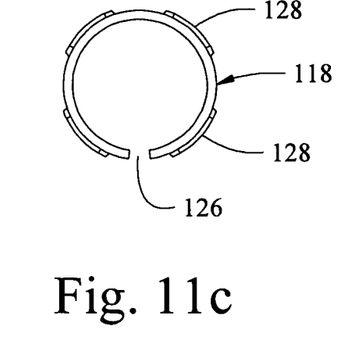
FIG. 11c is a top view of the sleeve.
Figure 11D:
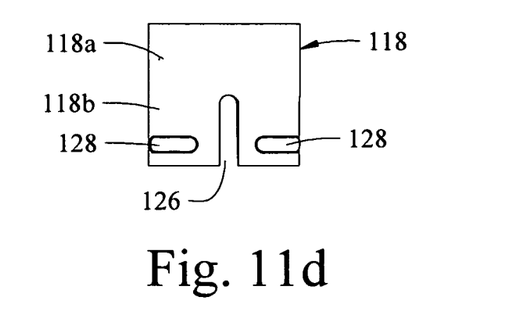
FIG. 11d is a side elevation view of the sleeve from a different side.
Figure 11E:
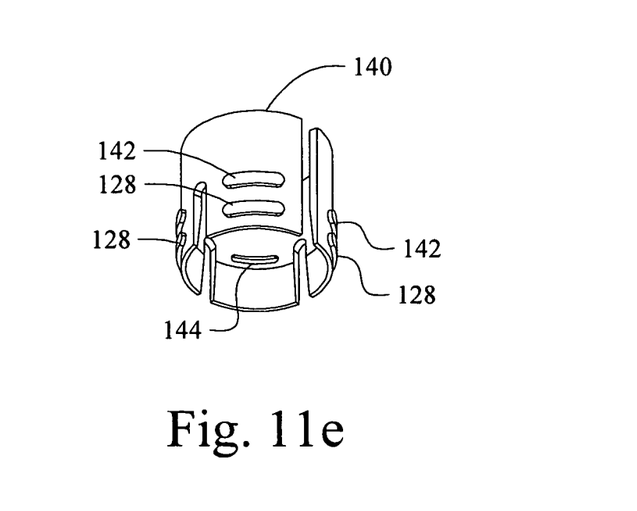
FIG. 11e is a three-dimensional view of an alternate embodiment of the sleeve, as viewed from a baseward aspect.

With reference to FIGS. 9*b* and 10*b*, an alternative strip 138 for providing a modified sleeve 140 (FIG. 11*e*) is shown as having bosses 128 as previously described, located as so described upon each section distal portion 118*a*" but including on each section proximal portion 118*a*' an additional upper boss 142. In this embodiment stamping is carried out to provide upon the inner surface 119' of strip 138 cavities 144 as artifacts of the stamping, it being apparent in FIG. 10*b* that each such dimple or cavity, corresponds, is opposed, to a respective additional boss 142. In other respects the outward profile of upper bosses 142 can in an embodiment be the same as that of lower bosses 128. The upper boss 142 will thus be seen to be more remote from the base than boss 128, or stated otherwise, bosses 128 are distal to bosses 142.

In use of the modified sleeve 140, initial setting of the anchor is carried out as above described, while during final setting generally shown in FIGS. 13-17, the additional upper bosses 142 also are driven into contact by the wedging action of base tapered portion 122 as the alternative sleeve 140 moves relative to the anchor body during tightening of the inserted threaded member such as bolt 116 to provide additional gripping force by jamming and wedging impingement against the inner surfaces of the borehole, adding further stability by providing both lower and slightly higher impingement regions. The lower bosses 128 function as previously described. During final setting of the anchor when there are upper bosses 142 and lower bosses 128, both sets of bosses can come into contact with interior surfaces of the borehole, but because the tapered base portion 128 causes the distal sleeve portions 118*a*" to first begin spreading radially outwardly, lower bosses 128 tend first to come into wedging contact with interior surfaces of the borehole and, as these lower bosses 128 are designed with thickness radial depth $RD_{tot}$, and thus intrinsically deeper than the material forming the upper bosses 142 that tend to have the same thickness $T_{seg}$ as the sleeve segments, the lower bosses 128 provide initial impingement with the material M in which the hole is provided, but additional tightening also then brings the upper bosses 142 into jammed contact with interior surfaces of the hole, and so can enhance the pull-out resistance of the finally set anchor.

In summary, according to a most preferred embodiment, the new hybrid drop-in anchor is provided with an anchoring sleeve. The anchor has internal threading and a split base region into which a setting plug can be driven baseward by setting tool for preliminary setting when the anchor is inserted, base end first, into a known borehole. A threaded male member can be threaded into the anchor for final setting. The expansion sleeve is annularly disposed about an external annular recess of the body, above a tapered portion of the base region that tapers in the baseward direction. The sleeve is formed by stamping of a flat blank of metal of predetermined blank thickness to have a clip arcuate portion of the sleeve extending at least most of the periphery around the external annular recess of the anchor body. The expansion sleeve has at least one or preferably more clip segments extending baseward from the clip arcuate portion for anchor engagement of surfaces of the borehole. The anchor body and expansion sleeve are diametrically dimensioned for fitting into the borehole when inserted. Further, each clip segment has a proximal portion and a distal portion, each segment proximal portion having a segment intrinsic radial thickness as measured from an outer surface to an inner surface at a proximal portion of the segment. The segment outer surface extends from the proximal portion to the distal portion. The segment intrinsic thickness is no greater than the predetermined blank thickness; each segment includes at least one intrinsic projection standing radially outwardly from the outer surface of the distal portion, which projection has been raised from the outer surface of the distal portion during stamping of metal of said blank, but without corresponding dimpling (that is, providing a corresponding cavity) of said blank, such that the segment has a projection of total radial depth measured from an outer surface of the projection to said inner surface that is greater than the segment intrinsic radial thickness. The projection total radial depth is greater than the predetermined blank thickness. After the setting plug is driven baseward, the threaded male member is inserted and tightened. This causes pulling movement of the anchor assembly but contact of the segments with the borehole walls moves the expansion sleeve baseward, such that each segment rides radially outwardly resiliently on the tapered portion for baseward radial expansion of the anchor to cause corresponding locking, wedging engagement of each segment projection with wall surfaces of the bore hole. This causes permanent setting of the anchor assembly in the bore hole with increased tightness providing enhanced pull-out resistance such that the anchor meets specifications for load and resistance against pull-out. These specifications can be cracked concrete specifications.

The embodiments shown and/or described were chosen and described to best explain the principles of the invention and its practical application and to enable others skilled in the art to best utilize the invention in various embodiments and with various modifications as are suited to the particular use contemplated. For example, the sleeve 118 may be formed with a ring wedge segment, or it may be formed with a number of sections different from the four sections shown. Further the number of bosses such as those at 128 and 142 can vary on the sections, and may be different from one section to the next, as for example, being present as two lower bosses on two sleeve sections, and both upper and lower bosses on two other sleeve sections, in alternating fashion. As a variation, the profile of the bosses 128 or 142 may vary, particularly as between the upper and lower bosses. As another variation, it is possible to provide on the clip segment multiple rows of bosses, such as in rings, one above another, in which all of the bosses have no corresponding cavity on the inner side of clip sections.

So also, procedures other than stamping might be used to create bosses 128. For example, application of additional thickness of metal to form the additional thickness of bosses 128, as by a welding, metal treatment technology, alloying, sputtering, spray-on metals, plating and other metal bonding, as well as adhesive application, might be used.

As various modifications could be made in the constructions and methods herein described and illustrated without departing from the scope of the invention, it is intended that all matter contained in the foregoing description or shown in the accompanying drawings shall be interpreted as illustrative rather than limiting.

What is claimed is:

1. A drop-in anchor provided with a body having internal threading, a base end and a split base region of the body, the split base region being configured such that a setting plug inserted therein can be driven toward the base end by a setting tool for preliminary setting of the anchor with the anchor being inserted, base end first, into a borehole, and the internal threading is configured such that a threaded male member can be threaded therein for final setting of the anchor and anchoring by the anchor, wherein:

the anchor body defines an external annular recess and a tapered portion tapering outwardly in a direction toward the base end;

an expansion sleeve is annularly disposed about the external annular recess of the body wherein the sleeve is comprised of a stamped flat blank of metal which comprises a clip arcuate portion of the sleeve extending at least most of the periphery around the external annular recess of the anchor body and which clip arcuate portion has a substantially uniform blank thickness;

the expansion sleeve further comprising one or more tapered clip segments extending toward the base end from the clip arcuate portion and being configured for anchor engagement with surfaces of the borehole, the anchor body and expansion sleeve being configured for fitting into the borehole with the anchor being inserted therein;

each tapered clip segment having a proximal portion and a distal portion with each tapered clip segment being separated from an adjacent tapered clip segment by a spacing slot open at the base end;

each clip segment proximal portion having a clip segment intrinsic radial thickness as measured from an outer surface to an inner surface at a proximal portion of the clip segment, said clip segment outer surface extending from the proximal portion to the distal portion with radial thickness of each clip segment being reduced in a taper extending from the proximal portion to the distal portion;

with each tapered clip segment including at least one intrinsic projection standing integrally radially outwardly from the outer surface of the distal portion thereof and which projection is raised from the outer surface of the distal portion and comprised of a metal uprise flow from metal removed from the respective clip segments immediately adjacent each of the at least one intrinsic projection and from an area of the reduced radial thickness taper, without a corresponding dimpling of said blank metal, such that the clip segment has a solid metal projection total radial depth measured from an outer surface of the projection to said inner surface that is greater than the blank metal thickness and with the respective clip segments, apart from each solid metal projection, having a radial thickness less than that of the blank metal thickness, wherein each projection is positioned between adjacent spacing slots and completely surrounded on the outer surface of the distal portion by blank metal wherein a distance between respective adjacent spacing slots is greater than a circumferential extension distance of the at least one projection between the respective adjacent spacing slots;

the anchor being configured such that with the setting plug being driven toward the base end, and the internal threading of the anchor being capable of and receiving said threaded male member, threading tightening of the male member causing pulling movement of the anchor so as to move the expansion sleeve toward the base end;

each tapered clip segment being configured to ride radially outwardly resiliently on the tapered portion for radial expansion of the anchor toward the base end with the expansion sleeve being moved toward the base end so as to cause corresponding moving and locking engagement of said projection away from the base end, with wall surfaces of the borehole, whereby to cause permanent setting of the anchor in the borehole, with increased tightness providing enhanced pull-out resistance.

2. A drop-in anchor as set forth in claim 1, with the anchor body and expansion sleeve being diametrically dimensioned, so that the anchor body and expansion sleeve together provide cylindrical surfaces of substantially the same outer diameter, for snugly fitting in the borehole.

3. A drop-in anchor as set forth in claim 1, with each said intrinsic projection being of generally bar shape arcuately along almost the entirety of the width of the segment distal portion but terminating just short of the edges of the distal portion.

4. A drop-in anchor as set forth in claim 1, with each said intrinsic projection being a boss generally of bar shape extending in arcuate length arcuately along almost the entirety of the width of the segment distal portion but terminating just short of the edges of the distal portion, and having height less than the arcuate extent of the boss.

5. A drop-in anchor as set forth in claim 4, with each boss having a height along the segment of about 10 to 20% of its arcuate length.

6. A drop-in anchor as set forth in claim 4, with each boss presenting in horizontal profile a truncated semipyramidal aspect extending radially outwardly from said distal portion.

7. In a drop-in anchor as set forth in claim 1, the improvement further characterized by each segment including at least one further intrinsic projection standing radially outwardly from the outer surface of the distal portion and which projection has been raised from the outer surface of the distal portion, the further projections being spaced apart from the first-said projections, and wherein the first-said projections are distal to the further projections.

8. In a drop-in anchor as set forth in claim 7, each segment having an inner surface and an outer surface, and wherein the first-said and further projections each extend radially outwardly from the outer surface and wherein cavities from stamping appear on the inner surface in positions corresponding to the further projections but no corresponding cavities from stamping appear on the inner surface in positions corresponding to the first-said, more distal, projections.

9. A drop-in anchor provided with a body having internal threading and a base end and a split base region of the body, the split base region being configured for insertion in a borehole such that a setting plug inserted therein can be driven toward the base end by a setting tool for preliminary setting of the anchor with the anchor being inserted, base end first, into the borehole, and the internal threading is configured such that a threaded male member can be threaded therein for final setting of the anchor in the borehole and anchoring by the anchor in the borehole, wherein:

the anchor body defines an external annular recess and a tapered portion tapering outwardly in a direction toward the base end;

an expansion sleeve annularly disposed about the external annular recess of the body wherein the sleeve is comprised of a stamped flat blank of metal which comprises a clip arcuate portion of the sleeve extending at least most of the periphery around the external annular recess of the anchor body and which clip arcuate portion has a substantially uniform blank metal thickness;

the expansion sleeve further comprising a plurality of tapered clip segments extending from the clip arcuate portion and being configured for anchor engagement with surfaces of the borehole, said tapered clip segments being at least two in number and spaced symmetrically around the periphery of the anchor body;

each tapered clip segment having a proximal portion and a distal portion with each tapered clip segment being separated from an adjacent tapered clip segment by a spacing slot open at the base end;

the anchor body and expansion sleeve being diametrically dimensioned and configured for snugly fitting in the borehole with the anchor being inserted therewithin with at least portions of distal portions of the tapered clip segments being in contact with wall surfaces of the borehole;

each tapered clip segment proximal portion having a clip segment intrinsic radial thickness as measured from an outer surface to an inner surface at a proximal portion of the clip segment, said clip segment outer surface extending from the proximal portion to the distal portion with radial thickness of each clip segment being reduced in a taper extending from the proximal portion to the distal portion;

the clip segment intrinsic thickness being no greater than the predetermined blank metal thickness;

each clip segment including at least one intrinsic projection standing integrally and radially outwardly from the outer surface of the distal portion and which projection is raised from the outer surface of the distal portion, and comprised of a metal uprise flow from metal removed from the respective segments immediately adjacent each of the at least one intrinsic projection and from an area of the reduced radial thickness taper, without corresponding cavity of said blank, such that the segment has a solid metal projection total radial depth measured from an outer surface of the projection to said inner surface that is greater than the blank metal thickness and with the respective segments having a radial thickness less than that of the blank metal thickness; wherein each projection is positioned between adjacent spacing slots and is completely surrounded on the outer surface of the distal portion by blank metal wherein a distance between respective adjacent spacing slots is greater than a circumferential extension distance of the plurality of projections between the respective adjacent spacing slots;

the projection total radial depth being greater than the predetermined blank metal thickness; with the setting plug being driven toward the base end, the anchor being configured such that the internal threading of the anchor is capable of receiving said threaded male member, such that with insertion of the anchor in the borehole and after the setting plug is driven toward the base end, threaded tightening of the male member causes pulling movement of the anchor assembly so as to move the expansion sleeve toward the base end;

each segment being configured to ride radially outwardly resiliently on the tapered portion for radial expansion of the anchor in a direction toward the base end when the expansion sleeve is moved in a direction toward the base end so as to cause corresponding moving and locking engagement of said projection, away from the base end, with wall surfaces of the borehole;

the projection, because of its projection total radial depth being essentially incompressible, thereby causing permanent setting of the anchor assembly in the borehole with increased tightening providing enhanced pull-out resistance such that the anchor meets specifications for load and resistance against predetermined pull-out under cracked concrete conditions.

10. A drop-in anchor as set forth in claim 9, with the body tapered portion tapering linearly outwardly in the direction towards the base end, at an angle relative to a longitudinal central axis of the body, which angle is in the range from about 11 degrees 30 minutes to about 13 degrees 30 minutes.

11. A drop-in anchor as set forth in claim 10, wherein said angle, relative to a longitudinal central axis of the body, is 12.7 degrees.

12. A drop-in anchor as set forth in claim 9, wherein each of the bosses in transverse profile presents a truncated semi-pyramidal aspect.

13. A drop-in anchor as set forth in claim 9, wherein the expansion sleeve is formed by stamping of a blank of 316 stainless steel.

14. A drop-in anchor as set forth in claim 9, with each said intrinsic projection being a boss generally of bar shape extending in arcuate length arcuately along almost the entirety of the width of the segment distal portion but terminating just short of the edges of the distal portion, and having a height less than the arcuate extent of the boss.

15. A drop-in anchor as set forth in claim 9, wherein each boss is of bar-like configuration of a height in the range of about 10 to 20% of its length.

16. In a drop-in anchor as set forth in claim 9, the improvement further characterized by each segment including at least one further intrinsic projection standing radially outwardly from the outer surface of the distal portion and which projection has been raised from the outer surface of the distal portion, the further projections being spaced apart from the first-said projections, and wherein the first-said projections are distal to the further projections.

17. In a drop-in anchor as set forth in claim 16, each segment having an inner surface and an outer surface, and wherein the first-said and further projections each extend radially outwardly from the outer surface and wherein corresponding cavities from stamping appear on the inner surface in positions corresponding to the further projections but no corresponding cavities from stamping appear on the inner surface in positions corresponding to the first-said, more distal, projections.

18. A hybrid drop-in anchor comprising: a body having a base end configured to be inserted into a borehole for the anchor;

the base end having a longitudinally split region; the split base region defining a tapered base region which tapers outwardly in a direction toward the base end;

the body having an external annular recess;

a setting plug configured to be driven toward the base end into the split base region toward the base end for preliminary setting of the anchor in a borehole;

a sleeve resiliently disposed about the external annular recess of the body above said tapered base region portion;

the sleeve having a clip arcuate portion of the sleeve extending at least most of the periphery around the external annular recess;

the sleeve having one or more clip segments that extend toward the base end from the clip arcuate portion;

each clip segment having a proximal portion having a segment intrinsic radial thickness;

each clip segment comprising a distal portion extending toward the base end; each distal portion having at least one intrinsic projection standing radially and integrally outwardly from an outer surface of the distal portion, with each clip segment being separated from an adjacent clip segment by a spacing slot open at the base end;

said intrinsic projection being positioned and configured such as to come into contact with internal walls of the borehole with the anchor being inserted into the borehole;

said intrinsic projection being raised from the outer surface of the distal portion and comprised of a metal uprise flow from metal removed from the respective segments immediately adjacent each of the at least one intrinsic projection, the intrinsic projection being of solid metal, without corresponding cavity on an inner surface of the distal portion; wherein each projection is positioned between adjacent spacing slots and is completely surrounded on the outer surface of the distal portion by blank metal wherein a distance between respective adjacent spacing slots is greater than a circumferential extension distance of the plurality of projections between the respective adjacent spacing slots;

said body defining internal threads configured such that, with the setting plug being driven toward the base end, a threaded male member which is inserted and tightened relative to the anchor causes pulling movement of the anchor;

wherein the anchor is configured such that said pulling movement of the anchor with contact of the segments with the borehole walls moves the expansion sleeve toward the base end, such that each segment rides radially outwardly resiliently on the tapered portion for with radial expansion of the anchor causing corresponding locking, wedging engagement of each segment projection with inner wall surfaces of the borehole for permanent setting of the anchor assembly in the borehole with increased tightening of the male member providing enhanced pull-out resistance.

19. An anchor as set forth in claim 18 wherein: the sleeve is formed from a stamped metal blank; the intrinsic projection being integrally raised from the outer surface of the distal portion without a corresponding cavity on an inner surface of the distal portion.

20. An anchor as set forth in claim 18 wherein: the sleeve is comprised of a flat blank of metal of predetermined blank thickness; each segment having an intrinsic radial thickness as measured from an outer surface to an inner surface at a proximal portion of the segment; each projection being integrally raised from the outer surface of the distal portion without corresponding cavity on an inner surface of the distal portion, such that the intrinsic projection is of thickened total solid metal depth greater than the segment intrinsic radial thickness.

* * * * *